Oct. 9, 1962 J. S. ZIMMER 3,057,047

METHOD OF MANUFACTURING CIRCUIT CONTROLLING DEVICES

Original Filed March 18, 1957 3 Sheets-Sheet 1

INVENTOR:
JOHN S. ZIMMER,

BY Melvin M. Goldenberg
HIS ATTORNEY.

METHOD OF MANUFACTURING CIRCUIT CONTROLLING DEVICES

Original Filed March 18, 1957 3 Sheets-Sheet 2

INVENTOR:
JOHN S. ZIMMER,
BY Melvin M. Goldenberg
HIS ATTORNEY.

METHOD OF MANUFACTURING CIRCUIT CONTROLLING DEVICES
FIG.10.
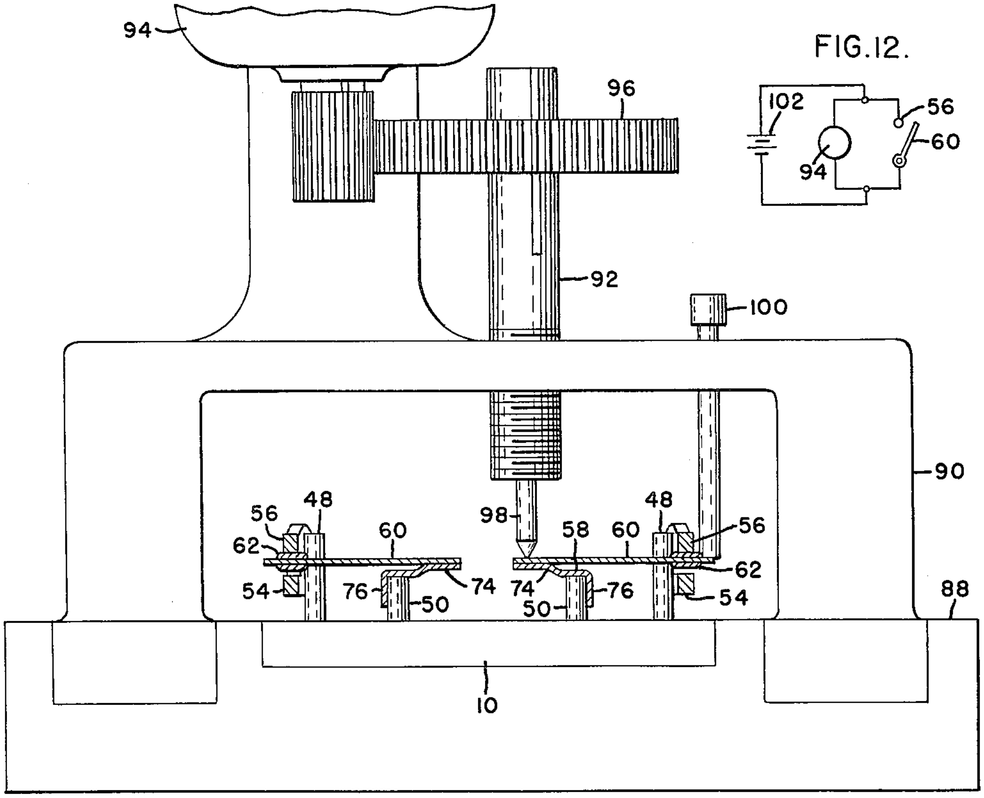
FIG.12.
FIG.11.
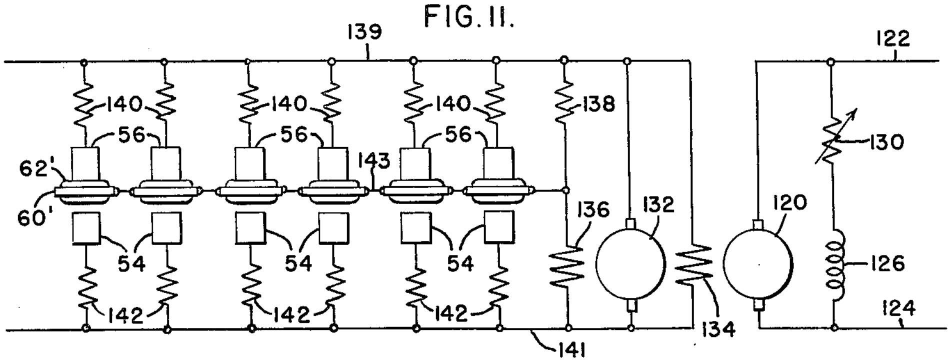
FIG.13.
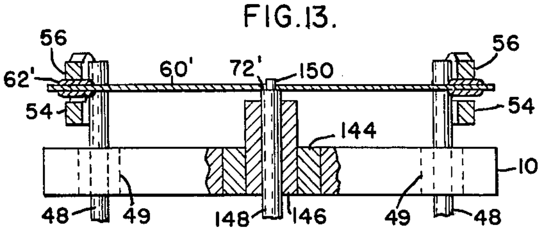
INVENTOR:
JOHN S. ZIMMER,
BY Melvin M. Goldenberg
HIS ATTORNEY.

3,057,047

METHOD OF MANUFACTURING CIRCUIT CONTROLLING DEVICES

John S. Zimmer, Waynesboro, Va., assignor to General Electric Company, a corporation of New York Original application Mar. 18, 1957, Ser. No. 646,823, now Patent No. 2,856,485, dated Oct. 14, 1958. Divided and this application June 19, 1958, Ser. No. 743,142
6 Claims. (Cl. 29—155.55)

This invention relates to improvements in methods of constructing devices for opening and closing circuits.

This application is a division of my application, Serial Number 646,823, filed March 18, 1957 and now Patent No. 2,856,485, and assigned to the same assignee as this application.

One of the significant problems in the construction of circuit-making and breaking devices such as electromagnetic relays and regulators is the adjustment of such devices to assure their operation within certain specified limits. This problem is particularly acute in the manufacture of small electromagnetic relays and regulators which are in great demand for application in aircraft and missiles. Large numbers of these devices may be used in any one installation. Their small size creates problems in their construction and assembly and, conventionally, a large number of hand adjustments of individual parts must be made particularly in those devices controlling a plurality of circuits. As is obvious, this increases their cost significantly and also increases the possibility of errors and correspondingly decreases their reliability. Further, in many instances, this imposes a definite limitation on any reduction in size and in the number of circuits which can be operated by any one such device.

Another factor adding to the cost of relatively small electromagnetic circuit controlling devices is the size and number of the parts which must be manipulated and secured during their assembly. For instance, in a device which controls a plurality of pairs of circuits normally closed, normally opened and movable contacts are provided for each pair of circuits. To provide a device for controlling N pairs of circuit contacts equal to 3N are provided and conventionally are individually adjusted and handled.

Therefore, it is an object of this invention to provide a novel electromagnetic circuit controlling device in which a relatively small number of parts must be handled during the assembly of the device but which, nevertheless, provide a device capable of controlling a large number of electrical circuits.

It is another object of this device to provide a novel method of assembling electromagnetic circuit controlling devices in which only three elements forming the circuit contact members are manipulated regardless of the number of circuits to be controlled by the device itself.

Briefly stated, one aspect of my invention is the provision of metallic blanks which can be rapidly assembled to constitute normally opened, normally closed and movable electrical contacts, and a method of assembly which involves the manipulation of only one blank regardless of the number of such contacts.

The subject matter which I regard as my invention is particularly pointed out and distinctly claimed in the concluding portion of this specification. My invention, however, both as to its organization and method of operation together with further objects and advantages thereof, may best be understood by reference to the following description taken in connection with the accompanying drawings in which:

FIG. 10 is an illustration of a test assembly usable in the assembly of an electromagnetic circuit controlling device incorporating my invention;

FIG. 11 is a schematic illustration of the use of the invention in an electrical regulating system;

FIG. 12 is a schematic illustration of the test circuit usable in conjunction with the test assembly in FIG. 10; and FIG. 13 is an illustration of an alternative embodiment of my invention usable in conjunction with the circuit illustrated in FIG. 11.

Figures 1, 2, 3:
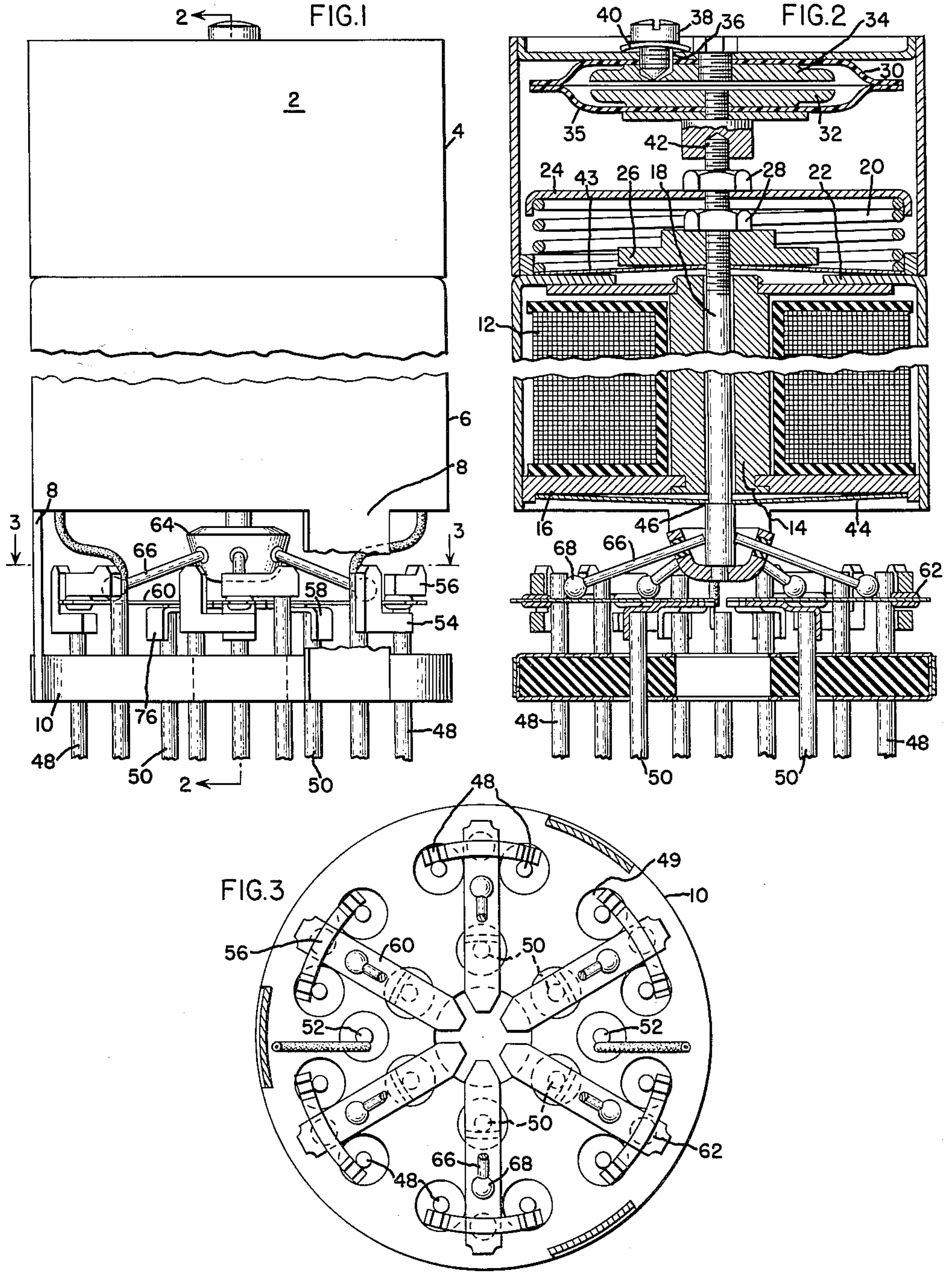
FIG. 1 is a front view of an electromagnetic circuit controlling device incorporating my invention.
FIG. 2 is a sectional view along the lines 2—2 of the device illustrated in FIG. 1.
FIG. 3 is a view taken along the lines 3—3 of FIG. 1.

In FIG. 1 of the drawing there is shown an electromagnetic circuit controlling device comprising a housing 2. An upper part 4 of the housing 2 encompasses a supporting and damping structure for the armature while a lower part 6 of the housing 2 supports an operating coil. The lower part of the housing includes a plurality of legs 8 which support it on a header assembly 10.

An operating coil 12 is mounted in the portion 6 of the housing 2 and encompasses a core 14. An apertured washer 16 is mounted below the coil 12 in a manner to be explained in greater detail hereinafter. A threaded shaft 18 passes through a central part of the cylindrical core 14 and a coiled spring 20. The coil spring 20 engages a radially extending portion 22 of the body 6 at its lower end and a flange spring retainer 24 at its upper end and, as illustrated in the drawing, exerts an upward force. The armature 26 encompasses the shaft 18 and the shaft is retained in an adjusted position by means of the lock nuts 28. Means for damping the reciprocating movement of the shaft 18 is provided by the use of a damping device such as shown at 30. In this form of the invention, the damping device comprises a lower piston 32 and an upper piston 34 housed inside of the sealed bellows 35 of the damping device 30. The bellows 35 is formed of a resilient material such as nylon and the passage of air in and out is controlled by the provision of an opening 36 in the upper piston 34 which, in conjunction with the pointed screw 38 passing through a spring washer 40, forms a valve in order that the air flow in and out of the bellows may be adjusted. An upper spring washer 43 engages the shaft and the armature 26 and, together with a lower spring washer 44 which engages the shaft at the shoulder 46, serves to maintain the shaft in a normal position. The shaft is normally urged in an upper direction as illustrated in the drawing by the action of the spring 20 against the spring retainer 24.

Passing through the header 10, which may be formed of a metallic material for purposes of strength, are a first plurality of contact pins 48 forming an outer ring of pins. A second plurality of contact pins 50 form an inner ring while a pair of contact pins 52 provide a means for furnishing energizing current to the coil of the device. Mounted on every other one of the pins 48 is a lower or normally open contact 54, while on the adjacent pins are the upper or normally closed contacts 56. Mounted on each one of the inner ring of contact pins 50 is a movable contact support 58. A movable contact arm 60 is mounted on each movable contact support 58 and extends radially outward between each pair of corresponding normally open and normally closed contacts. The movable contact arms 60 are formed of a resilient conducting material and each has provided on the free end thereof a conducting or contact portion 62 of a material such as silver. Provided on the lower end of the shaft 18 is a cup-like member 64 which supports a plurality of contact actuating arms 66 which depend downwardly from the cup member 64 and engage each of the movable contact arms 60 and are provided on their free ends with a surface of insulating material 68 which may take the form of a glass bead. The manner of assembling the contact actuating arms 66 in the cup 64 will be explained in greater detail below.

As pointed out above, the normal position of the shaft 18 is that it is urged upward by means of the spring 20. When the coil 12 is energized by an application of an electrical signal to the pins 52, the shaft 18 moves downwardly so that the actuating arms 66 engage the movable contact arms 60 to open the normally closed contacts 56 and close the normally open contacts 54. In the embodiment illustrated, the invention is shown as having six normally closed contacts and six normally open contacts so that the device may be defined as a six-pole double-throw circuit controlling device. The construction enables the building of such a device in a very small size. In order to properly construct such a device and to maintain desired accuracy at a very low cost, the invention contemplates the use of the method of assembly described below.

Figure 4:
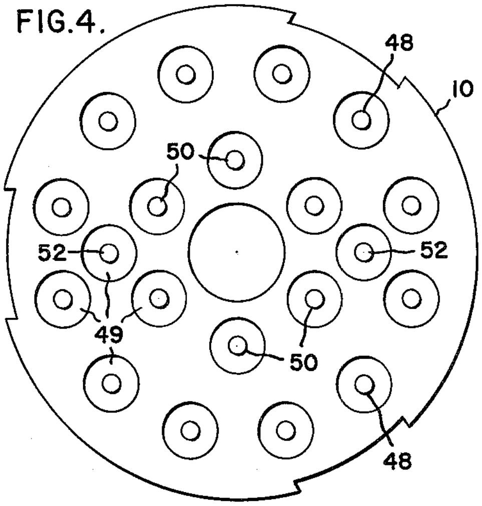
FIG. 4 is a plan view of a header forming part of the invention.
Figure 5:
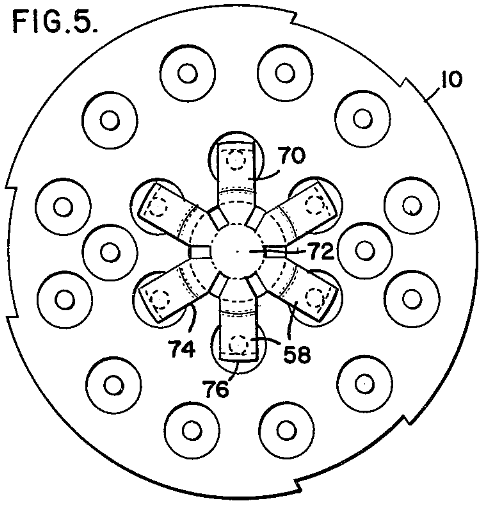
FIG. 5 is a view similar to FIG. 4 after one assembly step has been completed.
Figure 6:
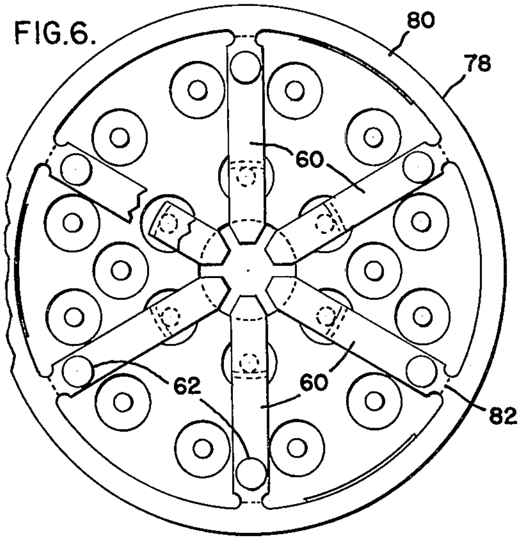
FIG. 6 is a view similar to FIG. 4 after a second assembly step has been completed.
Figure 7:
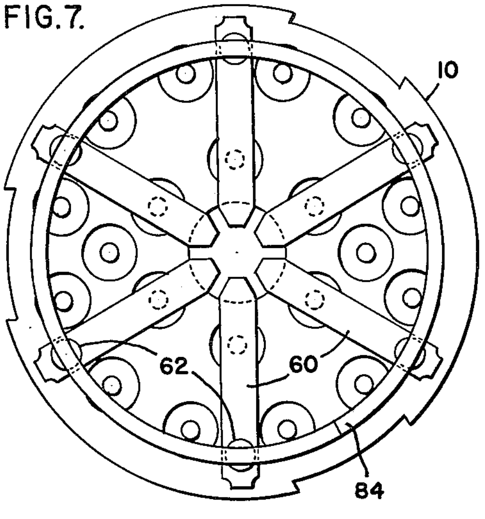
FIG. 7 is a view similar to FIG. 4 after a third assembly step has been completed.
Figures 8, 9:
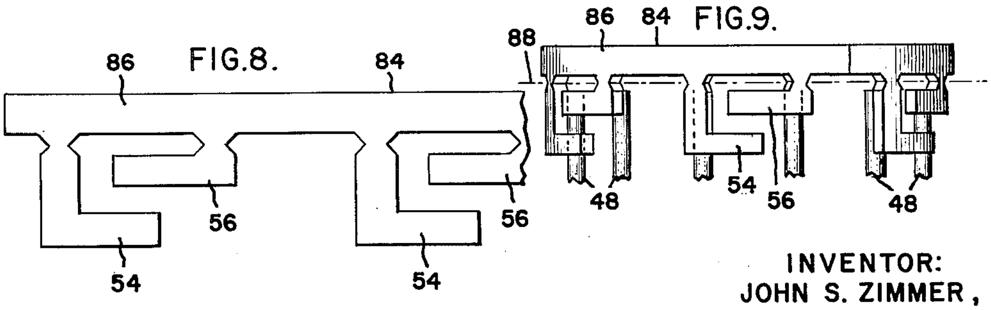
FIG. 8 is an illustration of a portion of a blank used in the construction and assembly of an electromagnetic circuit controlling device incorporating my invention.
FIG. 9 is an illustration of the blank illustrated in FIG. 8 after its assembly to the contact pins in the electromagnetic circuit controlling device.

FIGS. 5, 6 and 8 illustrate blanks of metallic material which may be formed by any suitable means such as punching which are used to form the subassemblies of the contact structure. FIG. 5 shows a blank 70 which comprises a central or supporting portion 72 from which the contact arm supports 58 extend radially. Each contact arm support comprises a portion 74 extending in the same plane as the central portion and a portion 76 extending at an angle thereto (as may be seen in FIG. 1). The first step in assembling the movable contact supports 58 is to secure the vertically extending portions 76 of the blank 70 to the pins 50 extending through the header 10 as shown in FIG. 4. This assembly, when complete, is illustrated in FIG. 5. In one form of the invention, that is when the device is to be used as a multi-pole double-throw electromagnetic relay, the center portion 72 of the contact arm support blanks 70 may be removed by cutting along the dotted line in FIG. 5 so that a plurality of individual contact arm supports 58 are formed as may be seen by an inspection of the drawing.

A second subassembly blank 78 is illustrated in FIG. 6, which blank is constituted by outer ring 80 and the radial arms 60. To assemble these to the movable contact arm supports 58, the inner ends of the contact arms 60 are secured to the supports 58 by any suitable means such as welding and the outer supporting ring 80 of the blank 78 is cut away along the dotted lines 82. In this manner, the movable contact arms have been mounted on the header 10. The third blank 84 comprises a strip or supporting portion 86 and an upper set of extending elements which may constitute the normally closed contacts 56 and a lower set of contacts which may constitute the normally open contacts 54. The strip forming this blank is bent to form a circular structure and the contacts 54 and 56 are secured to the outer pins 48 by any suitable means such as welding. The strip portion 86 is then cut away along the line 88 as seen in FIG. 9, and in this manner individual upper and lower contacts 54 and 56 respectively are provided.

To recapitulate the steps involved in the assembly of the contact structure, the movable contact arm support 70 is secured to the inner pins 50 and the central portion 72 cut away. The movable contact arms blank 78 is secured to the contact arm supports 58 and the rim 80 removed by cutting along the line 82. The strip 84 is bent to form a circle encompassing the outer pins 48 and the contacts 54 and 56 are secured as by welding to these pins and the strip portion 86 is cut along the line 88 in order to provide the individual contacts. From this method and arrangement of subassembly parts, it may be seen that only three elements need to be manipulated during the assembly of this device and this is so regardless of the number of contacts which it is desired to provide therein.

In order to eliminate and make automatic an adjusting step that is usually perforated by hand in the assembly of such electromagnetic devices, an adjusting assembly illustrated in FIG. 10 is provided. The adjusting assembly comprises a support 88 having a U-shaped frame 90 thereon. A threaded shaft 92 is engaged in threads provided in the U-shaped frame 90 and is driven by a motor 94 through a suitable gear train 96. An extension 98 on the threaded shaft 92 engages the movable contact arm 60 adjacent the horizontally extending portion 74 of the contact arm support 58. A weight 100 of a predetermined amount passes through an opening in the U-shaped frame and rests on the free end of the movable contact arm 60. The motor is energized to advance the shaft 92 downwardly bending the contact arm support 58 and lifting the movable contact arm 60 upwardly carrying the weight 100. The motor continues this operation until the contact 62 engages the normally closed contact 56 to stop the motor as may be seen from the circuit illustrated in FIG. 12 wherein reference numeral 102 designates a source of power supply which is normally connected to the motor 94 to cause it to rotate. When the support 58 is bent to cause the movable contact 60 to engage the normally closed contact 56, the circuit is shorted and the motor stops. In this manner, the support 58 is bent the proper amount to insure normal engagement with the contact 56. This adjusting operation is automatically effected for each set of contacts by indexing the header in a rotary manner to bring the contact arm into engagement with the extension 98 on the shaft 92.

In the assembly of the device, the actuating arms 66 are soldered in the apertures in the hub 64. After assembly of the complete device has been effected, a spacer is inserted between the end of the core 14 and the armature 26 and the coil 12 is energized so that armature 26 and shaft 18 move downwardly. The spacer functions to maintain correct spacing between the core 14 and armature 26 and at this stage of the assembly prevents the actuating arms 66 from opening the normally closed contacts 56. Heat is then applied to the area of the hub 64 to melt the solder securing the actuating arms 66 therein. The arms 66 then drop downward to engage the upper surfaces of the movable contact arms 60. The solder is then allowed to harden. Upon withdrawal of the spacer, the armature 26 and shaft 18 will continue to move downwardly as shown in the drawing and open all the contacts 56 simultaneously. By the use of this method, the invention eliminates the need for manual adjustment and repeated manipulations of the actuating arms 66 to insure the proper operation of the device.

In the form of my invention described above, since each one of the movable contact arms is separate from the other, the device constitutes an electromagnetic relay of the six-pole double-throw variety. In another form of my invention, the assembly and construction may be effected in such a manner as to provide an electromagnetic voltage regulator usable in a circuit such as shown in FIG. 11. In this figure, there is shown a generator 120 which furnishes an output via the conductors 122 and 124. Connected across the armature of the generator 120 is the coil 126 of an electromagnetic circuit controller as described above. A potentiometer 130 is connected in series with the coil 126 in order to limit the current flowing therein. A rotating exciter 132 energizes a field 134 of the generator 120. In order to control the voltage of the generator in response to changes in the load, the current in the field 136 of the exciter 132 is varied by controlling a resistance 138 in series therewith so that speed of the exciter is thereby controlled. Thus, the effective series resistance may be controlled by connecting the normally closed contacts 56 to a plurality of resistors 140 in parallel with the series resistor 138 and adding subtracting resistance in accordance with the load demands. The parallel connection is obtained by means of the connection 143 illustrated schematically between each one of the movable contacts 60.

The adjustment of the actuating arms 64 as described above is modified by providing spacers of graduated thickness between the movable contact and the normally closed contact in order to provide for sequential operation of the contacts. Thus, for example, if it is assumed that each contact should open in sequence for each .002″ travel of the armature a .012″ conducting spacer may be placed between the first normally closed contact, a .010″ spacer between the second normally closed contact, and so on for all of the contacts, and if the adjustment of the actuating arms 64 is carried out as described above, then when the spacers are removed and power is applied to the coil 14 after assembly, the contacts will not open simultaneously but the normally closed contact adjusted in conjunction with the .012″ spacer will open first. The one with the .010″ spacer will open next, and so on in the proper sequence. Thus, as a voltage regulator in the circuit shown in FIG. 11 when additional load is applied to the generator 120 the voltage output thereof will drop momentarily and the current through the coil 126 will be reduced. This reduces the magnetic pull on the armature opening the first contact and removing a first resistance 140 from the parallel connection with fixed resistor 138. This decreases the effective resistance in series with the winding 136 and, therefore, increases the drop across the winding 136 and accordingly the output of the exciter 132. A further drop will cause greater current through the coil 126 and accordingly additional resistors 140 will be taken out of the parallel circuit with resistor 138.

FIG. 13 illustrates an alternative embodiment of the invention usable as an electromagnetic voltage regulator in conjunction with the circuit illustrated in FIG. 11. In this embodiment, corresponding parts of the device have been given the same reference numeral. Since there is a common connection between the movable contact arms 60′, an insert 144 of an insulating material is provided in the header 10. A threaded bushing 146 is mounted in the insert and a threaded shaft or pin 148 engages therewith. The movable contact arms 60′ are formed with central support portion 72′ mounted on a shoulder 150 of the threaded shaft 148 and extend radially therefrom so that the movable contacts 62′ engage normally closed contacts 56. Thus, the pin or shaft 148 is electrically connected to one end of the resistor 138 while the normally closed contacts 56 are connected through the resistors 140 to the other end of the resistor 138 and to the conductor 139 supplying exciting current. The normally closed contacts are connected to the conductor 141 providing a return for the supply current.

Although in accordance with the provisions of the Patent Statutes this invention is described as embodied in a concrete form and specific method, the principles thereof have been explained together with the best manner in which it is now contemplated applying those principles, it will be understood that the apparatus and methods shown and described are merely illustrative and that the invention is not limited thereto since alterations and modifications will readily suggest themselves to persons skilled in the art without departing from the true spirit and scope of the invention, or from the scope of the annexed claims.

What I claim as new and desire to secure by Letters Patent of the United States is:

1. In a method of constructing and assembling a multiple circuit contact opening and closing device, the steps of providing a base having a plurality of first and a plurality of second pins thereon, said second pins being spaced outwardly with respect to said first pins, forming a first metallic blank having a central portion and a plurality of support portions corresponding to said first pins, forming a second metallic blank including a supporting ring and a plurality of radially extending arms corresponding to said support portions of said first blank, forming a third metallic blank including a supporting strip and a plurality of pairs of spaced contact elements extending therefrom, securing said support portions of said first blank to said first pins in said device and removing said central portion, securing said arms of said second blank to said support portions of said first blank and removing said supporting ring, and securing said contact elements of said third blank to said second pins in said device and removing said supporting strip.

2. In a method of constructing and assembling a multiple contact circuit opening and closing device, the steps of providing a base having a plurality of first and a plurality of second pins thereon, said second pins being spaced outwardly with respect to said first pins, forming a first metallic blank having a central portion and a plurality of radially extending arms, forming a second metallic blank having a supporting strip and a plurality of pairs of spaced contact elements, securing said arms of said first blank to respective ones of said first pins, removing said central portion, securing said pairs of said spaced contact elements of said second blank to respective ones of said second pins, and removing said supporting strip.

3. In a method of constructing and assembling a multiple circuit contact opening and closing device, the steps of providing a base having pins thereon, forming a first metallic blank having a central portion and a plurality of support portions each including a portion extending in the same plane as said central portion and including a portion extending at an angle thereto, forming a second metallic blank including a supporting ring and a plurality of radially extending arms, securing said support portions of said first blank to said pins and removing said central portion, and securing said arms of said second blank to said support portions of said first blank and removing said supporting ring.

4. In a method of constructing, assembling, and adjusting a multiple contact circuit opening and closing device, the steps of providing a base having pins thereon and having an element movable with respect to said base, forming first and second metallic blanks having respective supporting portions and respective contact portions extending therefrom, securing said contact portions of said first blank to said pins, securing said contact portions of said second blank to said contact portions of said first blank, removing the supporting portion from at least one of said blanks, securing, by applying a thermal bonding material, a number of contact actuating arms equal to the number of said contact portions of said second blank to said movable element of said device, actuating said movable element, applying heat to the area wherein said contact actuating arms are secured to at least partially melt said material and cause said contact actuating arms to respectively engage said contact portions of said second blank, and withdrawing said heat to permit said material to cool and hold said contact actuating arms in an assembled and an adjusted position.

5. In the method defined in claim 4, the step of inserting graduated spacers between said contact portions prior to the application of the heat.

6. In the method defined in claim 4, the step of sequentially placing each of said contact portions of said second blank in a motor control circuit effective to stop said motor when said contact portions of said second blank reach a predetermined position to adjust said contact portions of said second blank.

References Cited in the file of this patent

UNITED STATES PATENTS

| | | |
|---|---|---|
| 1,739,246 | Majce | Dec. 10, 1929 |
| 2,364,989 | Mallina | Dec. 12, 1944 |
| 2,454,060 | Hegy | Nov. 16, 1948 |
| 2,631,211 | Klay | Mar. 10, 1953 |
| 2,635,154 | Zuckerman | Apr. 14, 1953 |
| 2,650,957 | Cohen | Sept. 1, 1953 |
| 2,670,530 | Regnier | Mar. 2, 1954 |
| 2,677,875 | White et al. | May 11, 1954 |
| 2,749,403 | Horman et al. | June 5, 1956 |